United States Patent [19]

Yasunaga

[11] Patent Number: 4,754,455
[45] Date of Patent: Jun. 28, 1988

[54] TELEPHONE SIGNAL TRANSMISSION DEVICE

[75] Inventor: Satoshi Yasunaga, Tokyo, Japan

[73] Assignee: NEC Corporation, Tokyo, Japan

[21] Appl. No.: 885,125

[22] Filed: Jul. 14, 1986

[30] Foreign Application Priority Data

Jul. 12, 1985 [JP] Japan .................................. 60-152441

[51] Int. Cl.⁴ ............................................... H04J 3/12
[52] U.S. Cl. .................................... 370/110.1; 379/93
[58] Field of Search ................ 379/93, 102; 370/110.1

[56] References Cited

U.S. PATENT DOCUMENTS 4,007,334  2/1977  McDonald ........................ 370/110.1

Primary Examiner—Douglas W. Olms
Assistant Examiner—James E. Busch
Attorney, Agent, or Firm—Sughrue, Mion, Zinn, Macpeak and Seas

[57] ABSTRACT

A telephone signal transmission device capable of transmitting and receiving dial pulses in a network system which includes a telephone exchange is disclosed. Transitions of a connection signal are detected to allow a connection signal to be transmitted only when the transmission of a speech signal is needless. When the connection signal has a stable state (i.e. high or low) within a frame, only one bit is transmitted. The device effectively utilizes substantially all of the transmission bits for speech.

5 Claims, 3 Drawing Sheets

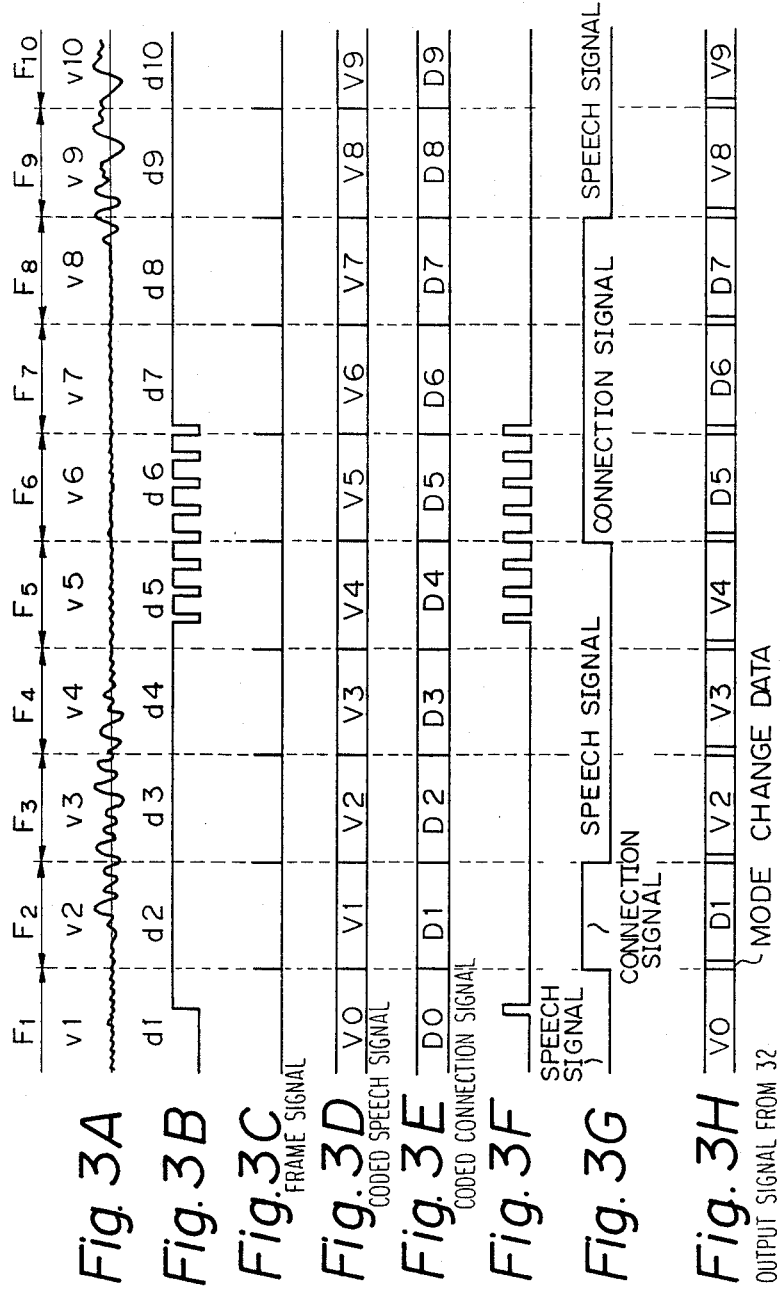

TELEPHONE SIGNAL TRANSMISSION DEVICE

BACKGROUND OF THE INVENTION

The present invention relates to a telephone signal transmission device and, more particularly, to a digital speech CODEC capable of transmitting and receiving dial pulses in a network system which includes a telephone exchange.

In a digital telephone network, it has been customary for a telephone signal transmission device to transmit a dial signal at a rate of, for example, one bit for each 750 microseconds per channel in addition to a speech signal, as has been the case with a PCM24B system which transmits a 1.54 megabit/sec. signal, as shown in the specification set forth in CCITT G 704. Thus, the prerequisite for a telephone network to be constructed is that a dial signal be transmitted one bit for at least each 1.2 milliseconds or so in order to comply with a duty ratio of 33.5±5 percent, which is the standard of dial distortion.

In a prior art telephone signal transmission device based on the PCM24B system, for example, a dial signal occupies only 1.3K bits per second, or 2 percent, of the total amount of information which may be transmitted on one channel, i.e. 64K bits per second. However, the situation is different when it comes to a band compression type CODEC which is extensively used with an office network and other private networks. Specifically, assuming that a dial signal is coded by such a CODEC at the lowest allowable bit rate of 800 bits per second, the proportion of the dial signal to the total information per channel amounts to 2.5 percent in a 32K bits per second ADPCM system and even to 33 percent in a 2.4K bits per second vocoder. This represents a dilemmatic situation that the lower the bit rate to which speech is coded by band compression technology, the greater the proportion of a dial signal to the total amount of information per channel is, resulting in various drawbacks such as degradation of the quality of sound.

SUMMARY OF THE INVENTION

It is therefore an object of the present invention to provide a telephone signal transmission device which enhances the quality of sound by effectively utilizing substantially all of the transmission bits for speech.

It is another object of the present invention to provide a generally improved telephone signal transmission device.

A telephone signal transmission device using frames each being made up of a plurality of bits of the present invention comprises a transmitter having a speech signal coder for coding a speech signal inputted, a connection signal coder for coding a connection signal inputted, a connection signal transition detector for detecting transitions of the connection signal, and a transmission signal selector for selecting a transmission signal in response to an output of the connection signal transition detector. The device also comprises a receiver means having a speech signal decoder for decoding a speech signal, a connection signal decoder for decoding a connection signal, and a distributor for distributing a received signal to the speech signal decoder and connection signal decoder in response to an output signal of the connection signal transition detector.

In accordance with the present invention, a telephone signal transmission device is capable of transmitting and receiving dial pulses in a network system which includes a telephone exchange. Transitions of a connection signal are detected to allow a connection signal to be transmitted only when the transmission of a speech signal is needless. When the connection signal has a stable state (i.e. high or low) within a frame, only one bit is transmitted. The device effectively utilizes substantially all of the transmission bits for speech.

The above and other objects, features and advantages of the present invention will become more apparent from the following detailed description taken with the accompanying drawings.

BRIEF DESCRIPTION OF THE DRAWINGS

FIGS. 3A to 3H are timing charts representative of signals appearing in various portions of the transmitter of FIG. 1.

DESCRIPTION OF THE PREFERRED EMBODIMENT

An embodiment of the telephone signal transmission device in accordance with the present invention will be described with reference to FIGS. 1, 2 and 3A to 3H.

Figure 1:
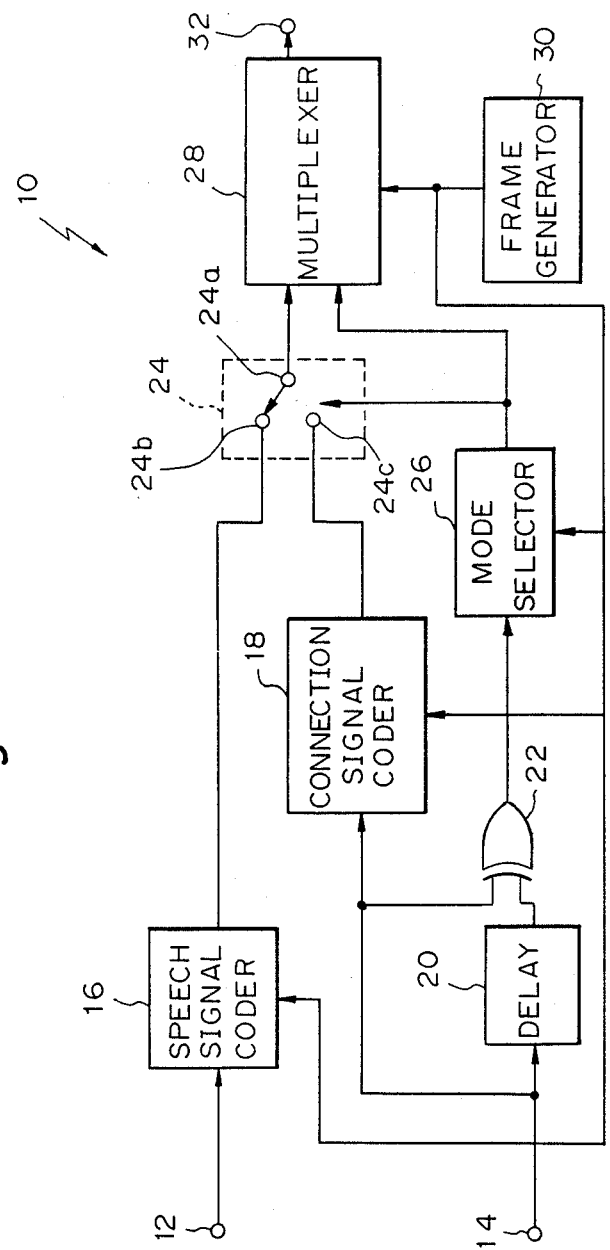
FIG. 1 is a block diagram showing a transmitter of a telephone signal transmission device embodying the present inveniton.

Referring to FIG. 1, a transmitter which forms a part of the device of the present invention is shown and generally designated by the reference numeral 10. As shown, the transmitter 10 includes an input terminal 12 to which a speech signal as shown in FIG. 3A is applied, and another input signal 14 to which a connection signal as shown in FIG. 3B is applied. The input terminal 12 is interconnected to a speech signal coder 16 which is adapted to code the speech signal of FIG. 3A to produce a coded speech signal as shown in FIG. 3D. A connection signal coder 18 functions to code the connection signal of FIG. 3B to produce a coded connection signal as shown in FIG. 3E while a delay circuit 20 serves to delay the connection signal. The delay circuit 20 is interconnected to one input terminal of an Exclusive-OR (Ex-OR) gate 22 to the other input terminal of which is applied the connection signal. The Ex-OR gate 22 is adapted to produce a connection signal transition signal as shown in FIG. 3F. A switch 24 includes a movable contact 24a and stationary contacts 24b and 24c. A mode selector 26 which is interconnected to the switch 24 is constructed to produce a mode select signal for switching a frame in which a transition of the connection signal occurred and a frame in which no transition occurred from one to the other. The mode selector 26 is also connected to a multiplexer 28. A frame generator 30 functions to generate a frame signal as shown in FIG. 3C. On an output terminal 32 of the transmitter 10, in accordance with an output of the mode selector 26 as shown in FIG. 3G, a frame immediately after a frame in which the connection signal underwent a transition is transmitted as a connection signal frame. Other frames are transmitted as speech signal frames, as shown in FIG. 3H. The speech signal coder 16 may be implemented as disclosed in A. Araseki et al., "MULTI-PULSE EXCITED SPEECH CODER BASED ON MAXIMUM CROSSCORRELATION SEARCH ALGORITHM", IEEE Global Telecommunications Conference (GLOBECOM) 83, Presentation No. 23.3, pp. 794-798. The connection signal coder 18 may comprise a 7-bit analog-to-digital converter, and the mode selector 26 a differentiator, an Ex-OR circuit or the like.

Figure 2:
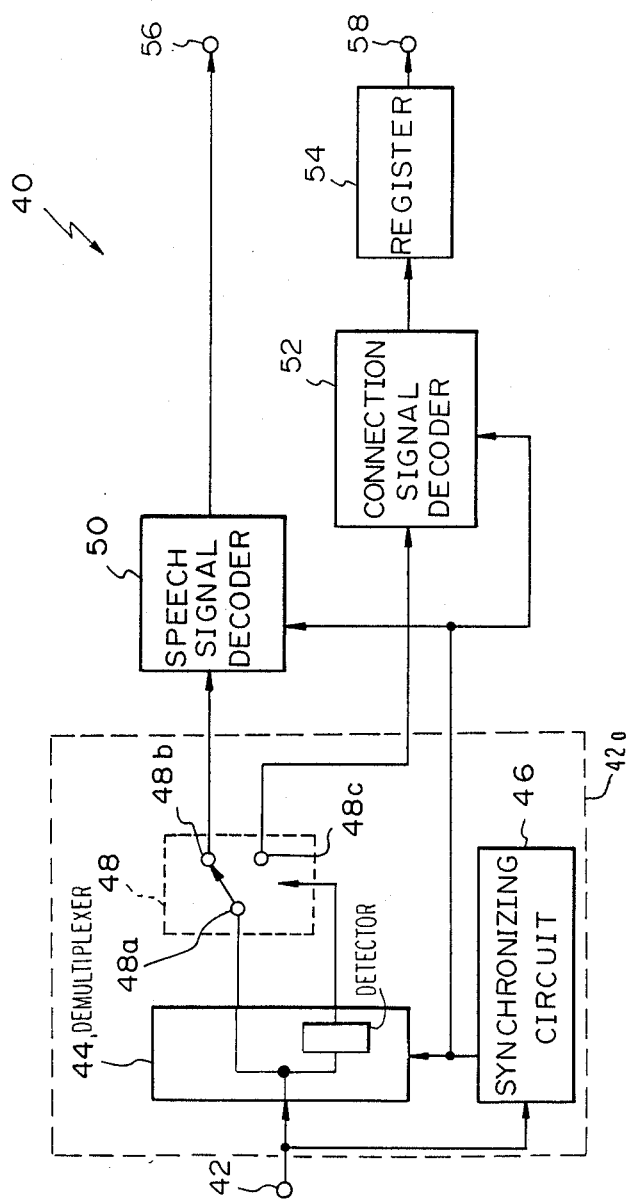
FIG. 2 is a block diagram showing a receiver of the device as shown in FIG. 1.

Referring to FIG. 2, a receiver which forms the other part of the device 10 is shown. The receiver, generally 40, comprises an input terminal 42, a demultiplexer 44, a synchronizing circuit 46, a switch 48 having a movable contact 48a and stationary contacts 48b and 48c, a speech signal decoder 50, a connection signal decoder 52, a register 54, an output terminal 56 allocated to a speech signal, and another output terminal 58 allocated to a connection signal.

It is to be noted that $F_1$ to $F_{10}$ as shown in FIG. 3A each represents a frame.

The telephone signal transmission device 10 having the above construction will be operated as follows.

A speech signal shown in FIG. 3A is applied to the speech signal decoder 16 via the input terminal 12. In response to a frame signal of FIG. 3C as generated by the frame generator 30, the signal speech decoder 16 codes the input speech signal frame by frame and produces the speech signal coded as shown in FIG. 3D on an output thereof. The coded speech signal is applied to the stationary contact 24b of the switch 24. Meanwhile, a connection signal shown in FIG. 3B is fed from the other input terminal 14 of the device 10 to the connection signal coder 18, delay circuit 20 and Ex-OR gate 22. The connection signal coder 18 codes the connection signal frame by frame timed to the frame signal of FIG. 3C which is applied thereto from the frame generator 30. The output of the coder 18, i.e., a coded connection signal as shown in FIG. 3E, is applied to the stationary contact 24c of the switch 24. The Ex-OR gate 22 produces Ex-OR of the input connection signal and the output of the delay circuit 20, i.e., delayed connection signal with the result that a signal representative of transitions of the connection signal as shown in FIG. 3F is applied to the mode selector 26. In response, the mode selector 26 examines the transition detection signal frame by frame timed to the frame signal of FIG. 3C so as to produce a mode select signal which designates a frame in which the connection signal showed any transition as a connection signal frame and a frame in which it showed no transition as a speech frame, as shown in FIG. 3G. Consequently, the multiplexer 28 delivers to the output or transmit terminal 32 a signal representative of frame statuses in a form of one bit or one pattern in a plurality of bits (e.g. "1111"; in this case, the other patterns are assigned to a speech signal) together with the frame signal which is selectively multiplexed with the coded speech signal and coded connection signals.

At the receiver 40, the signal coming in through the input or receive terminal 42 is applied to the demultiplexer 44 and synchronizing circuit 46. Detecting frames, the synchronizing signal 46 delivers a frame signal to the demultiplexer 44, speech signal decoder 50 and connection signal decoder 52. In response to the frame signal, the demultiplexer 44 separates the received signal into a speech signal and a connection signal and, if the separated signal is a speech frame, a connection signal transition detector 44a within the demultiplexer 44 connects the movable contact 48a of the switch 48 to the stationary contact 48b to apply the signal to the speech signal decoder 50 and, if it is a connection signal frame, connects the movable contact 48a to the other stationary contact 48c to apply the signal to the connection signal decoder 52. Thus, the demultiplexer 44, the synchronizing circuit 46, and the switch 48 constitute a distributor 42a for the received signal. Timed to the frame signal outputted by the synchronizing circuit 46, the speech signal decoder 50 decodes the coded speech signal frame by frame and delivers the decoded signal to the speech output terminal 56. Likewise, the connection signal decoder 62 decodes the coded connection signal frame by frame responsive to the frame signal, the resultant signal being fed to the register 54. The register 54, therefore, memorizes during a speech frame a status of the final connection signal before the speech frame and delivers the memorized signal to the connection signal output terminal 58.

It is to be noted that where one of the speech bits is allocated to steady transmission of a connection signal as shown and described, incompatibility between a transmitting and a receiving station otherwise occurring during recovery of a channel after a disconnection naturally can be eliminated.

In summary, it will be seen that the present invention provides a telephone signal transmission device which makes it unnecessary for a part of transmission bits to be constantly assigned to a connection signal and, thereby, allows substantially all of the transmission bits to be utilized for speech. This unprecedented advantage is derived from a unique construction wherein means for detecting transitions of a connection signal is provided to transmit a connection signal only when the transmission of speech is not required, e.g. when the connection signal undergoes transitions due to off- and on-hooks and when a dial is turned.

Various modifications will become possible for those skilled in the art after receiving the teachings of the present disclosure without departing from the scope thereof.

What is claimed is:

1. A telephone signal transmission device for transmitting and receiving signals in frames, each of said frames comprising a plurality of bits, said device comprising:

transmit means, including:
    speech signal coder means for coding an input speech signal;
    connection signal coder means for coding an input connection signal having first and second states, and being capable of undergoing transitions between said first and second states;
    first connection signal transition detector means for detecting transitions in state of the connection signal, said first connection signal transition detector means including delay means for delaying said connection signal, and exclusive-OR means for producing a signal representative of transitions of said connection signal in response to said connection signal, and to an output of said delay means; and
    transmission signal selector means for selecting a transmission signal in response to an output of said first connection signal transition detector means; and
  receive means, including:
    means for receiving said transmission signal as a received signal;
    distributor means for distributing said received signal as a speech signal portion and a connection signal portion, said distributor means including second connection signal transition detector means for detecting transitions in state of said connection signal portion;

speech signal decoder means for decoding said speech signal portion; and connection signal decoder means for decoding said connection signal portion.

2. A telephone signal transmission device as claimed in claim 1, wherein said transmission signal selector means comprises switch means for selecting one of the input connection signal and the input speech signal, and mode selector means for producing a mode select signal for selecting between a frame in which the connection signal underwent a transition in state and a frame in which the connection signal underwent no transition in state.

3. A telephone signal transmission device as claimed in claim 2, wherein said transmit means further has frame generator means for generating a frame signal.

4. A telephone signal transmission device as claimed in claim 3, wherein said transmit means further has multiplexer means for producing the transmission signal by multiplexing output signals of said switch means and mode selector means.

5. A telephone signal transmission device as claimed in claim 1, wherein said distributor means further comprises:

synchronizing means for generating a frame signal by detecting frames out of said received signal;

demultiplexer means for separating said received signal into said speech signal portion and said connection signal portion in response to the frame signal, said demultiplexer means including said second connection signal transition detector means; and switch means for selecting between said speech signal portion and said connection signal portion an output of said switch means being applied to said speech signal decoder means.

* * * * *